United States Patent [19]

Sommer et al.

[11] Patent Number: 4,478,887
[45] Date of Patent: Oct. 23, 1984

[54] REINFORCED SUPPORT SHEET AND METHOD FOR MAKING SAME

[75] Inventors: Horst Sommer, Musberg; Hansgeorg Gronle, Filderstadt, both of Fed. Rep. of Germany

[73] Assignee: Elring Dichtungswerke GmbH, Fellbach, Fed. Rep. of Germany

[21] Appl. No.: 415,812

[22] Filed: Sep. 8, 1982

[30] Foreign Application Priority Data

Sep. 11, 1981 [DE] Fed. Rep. of Germany ....... 3136015

[51] Int. Cl.³ .............................................. C09J 5/02
[52] U.S. Cl. .................................. 427/211; 427/409; 277/DIG. 6; 156/307.3; 156/307.7; 428/284; 428/172
[58] Field of Search ................... 156/307.3, 313, 307.7; 427/409, 372.2, 235 A, 211; 277/DIG. 6

[56] References Cited

U.S. PATENT DOCUMENTS

| 87,087 | 2/1869 | Dwight | 156/307.7 |
|---|---|---|---|
| 1,339,696 | 5/1920 | Duffy | 156/307.3 |
| 3,290,195 | 12/1966 | Davis | 156/307.3 |
| 3,897,576 | 7/1975 | Qualtrough et al. | 427/211 X |
| 3,922,391 | 11/1975 | Quatrough et al. | 427/211 X |
| 4,319,942 | 3/1982 | Brenner | 156/307.3 |
| 4,337,111 | 6/1982 | Kauffman et al. | 156/307.3 |

FOREIGN PATENT DOCUMENTS

| 23648 | of 1913 | United Kingdom | 156/307.3 |
|---|---|---|---|
| 459544 | 7/1937 | United Kingdom | 277/DIG. 6 |
| 493139 | 10/1938 | United Kingdom | 150/307.3 |

Primary Examiner—George F. Lesmes
Assistant Examiner—Nancy A. B. Swisher
Attorney, Agent, or Firm—Allison C. Collard

[57] ABSTRACT

A reinforced support sheet or plate, especially for making flat gaskets or heat dampening plates is made of a sheet or plate-like support material which is covered with a vulcanizable soft material layer which contains a fiber-like and, if need be, powder-like binder material. The support material is smooth and the soft layer material is composed predominantly of a powder-like, asbestos-free mineral base material. A method for making such a sheet or plate is also disclosed.

6 Claims, 1 Drawing Figure

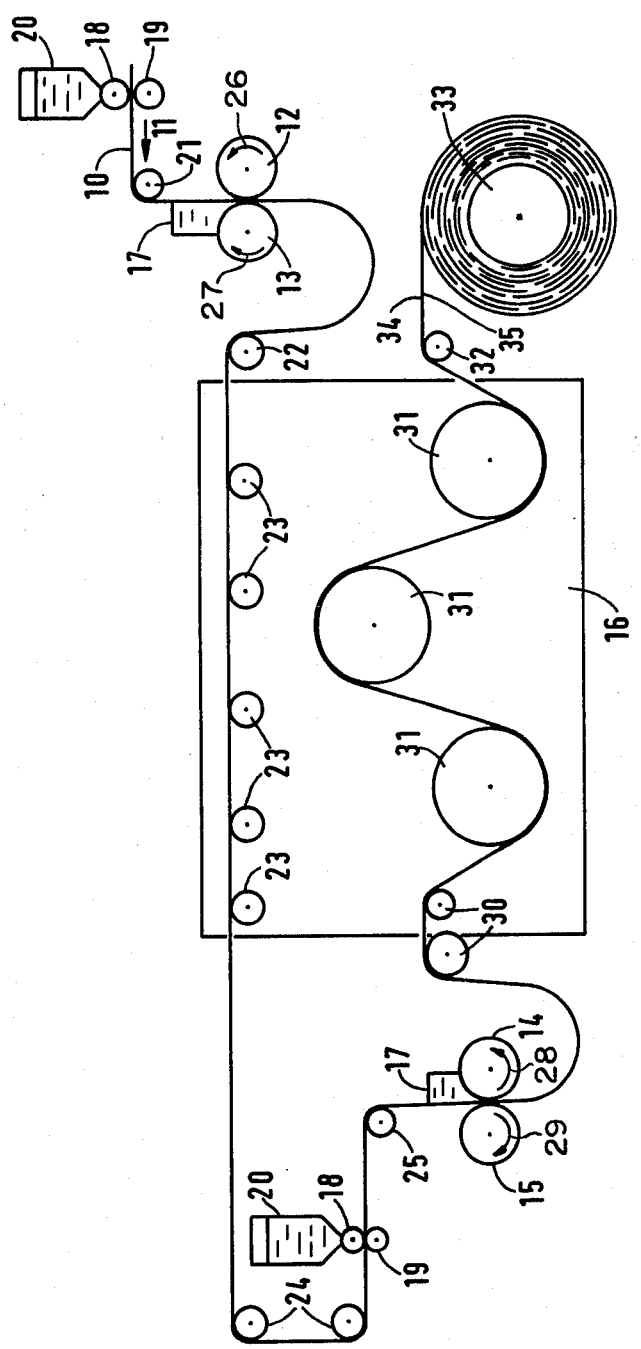

REINFORCED SUPPORT SHEET AND METHOD FOR MAKING SAME

The present invention relates to a reinforced support sheet or plate, especially suitable for making flat gaskets, as well as heat dampening plates. More particularly, it relates to such a sheet or plate having a sheet or plate-like support material which is covered with a vulcanizable, soft material which contains fiber-like and, if need be, powder-like base materials, as well as a binder material.

A reinforced support sheet of the aforementioned type is disclosed in German Auslegeschrift (DE-AS) No. 21 46 309. The subject matter of the aforementioned reference is, in particular, a method for making such a reinforced support material. Therein, a dough-like, fiber-reinforced elastomer mixture (as the soft material) is applied by means of calender rollers, with the aid of additional water, onto a metallic support material. The additional water is required so as to avoid an adhering of the dough-like material onto the calender rollers. The dough-like soft material consists of a rubber-asbestos mixture in a ratio of about 1:1.

As previously indicated, reinforced sheets of the aforementioned type may be used as a base material for making flat gaskets which are subjected to high mechanical and thermal stresses, for example, cylinder head gaskets in combustion engines. In such sealing systems, which are subjected to high dynamic stresses, the following characteristics of the gaskets employed are important:

(a) adaptability;
(b) pressure resistance;
(c) spring back resilience
(d) gas and liquid tightness;
(e) temperature resistance;
(f) longitudinal and transverse stability;
(g) hardness of the cutting edges; and
(h) corrosion resistance.

In this respect, the reinforced support sheets or the flat gaskets made out of these sheets in accordance with the known method of DE-AS No. 21 46 309 have substantial disadvantages. The required dough-like base condition of the soft material requires a high rubber content of the same. On account of this requirement, gasket plates made from this reinforced support sheet have a very low pressure resistance, an insufficient temperature resistancy, as well as a completely insufficient longitudinal and transverse stability.

Furthermore, the dough-like mass of the soft materials adheres to the calender rollers during manufacturing. As mentioned above, it has been attempted to overcome this disadvantage by adding additional water. However, this results in a different significant disadvantage in that the adherence ability of the dough-like soft material onto the support material is severely diminished, especially when a sheet metal is used without a mechanical clamping, fastening or mounting associated therewith. It is quite obvious that such a soft material is not usable for making flat gaskets which have to have the aforementioned criteria.

It is therefore an object of the present invention to afford a reinforced support sheet or plate of the aforementioned type wherein the mentioned disadvantages of the known reinforced sheets or plates or the products made therefrom, for example, gaskets, are eliminated and, in addition, to provide a simple and cost saving method for making such a reinforced sheet or plate.

In accordance with the invention, certain of the foregoing and related objects are obtained by the provision of a support sheet or plate of the aforementioned type, wherein the support material is smooth and the soft material layer predominantly consists of a powder-like, asbestos-free, mineral base material.

In the inventive reinforced support sheet or plate, a dough-like base condition of the soft material is eliminated. Thereby, it is advantageously possible to reduce the rubber content (binder content), thus obtaining a high pressure resistance of the sheet or the flat gaskets made therefrom. A further significant advantage of the invention is that an application of additional water onto the calender rollers is no longer required. This results in the advantage that an excellent adherence ability of the soft material rolled onto the support material is obtained, even if the support material is a smooth sheet metal, foil, fleece or fabric. On account of the invention, it is possible to eliminate a mechanical mounting. Consequently, a very great advantage can be seen in that the reinforced support sheet or plate and the products made therefrom, like flat gaskets, for example, cylinder head gaskets, can be made substantially thinner than known gasket sheets or flat gaskets.

In accordance with the invention, certain of the foregoing and related objects are also attained in a method for making such a reinforced support sheet or plate, where the soft material is applied successively onto both sides of the support material by means of calender rollers and, afterwards, is dried and vulcanized in an oven. In accordance with this novel method, a separate pair of calender rollers is provided for each of the sides of the support material to be coated and this soft material is applied as a flowable bulk material onto the given side of the support material immediately before it enters the opening between the given pair of calender rollers. The two rollers of the given pair of calender rollers are driven at unequal circumferential speeds.

Due to the unequal circumferential speed of the two rollers of the given pair of calender rollers, a friction is exerted on the flowable soft material which is applied onto the support material which results in an excellent adherence of the soft material onto the surface of the support material. Due to the different circumferential speeds of the calender rollers, a further advantage is obtained in that an application of additional water on the calender rollers is no longer required. The elimination of the additional water again enhances the aforementioned adherence ability of the soft material which is rolled onto the support material. A further advantage of the inventive method is that an additional pulling device for the support material, which is required with known methods, can be eliminated.

A great advantage of the invention is that the adhesive which, in most cases, is applied onto the support material before the coating operation, can be eliminated in almost all applicable cases. On the other hand, the invention does not exclude the use of an adhesive. For example, it is advisable to provide the support material with adhesive when the inventive sheet is used as a base material for making cylinder head gaskets which stand freely in water.

At any rate, i.e., whether an adhesive is applied onto the support material or not, a dryer for the adhesive is eliminated in the inventive method (but is required in the known method disclosed in DE-AS No. 21 46 309).

This means a considerable saving in energy relative to the method in accordance with DE-AS No. 21 46 309.

In the case where an adhesive is used, it is preferred in accordance with the invention not to dry the adhesive because it assures a particularly good adherence of the soft material on the support materal in its tacky state.

As already indicated above, the inventive method enables a concentrated adhesion of the soft material onto the support material without causing an adherenece on the calender rollers which would render the coating unusable. A further considerable advantage of the invention can be seen in that a single oven is used for the drying and vulcanization of the applied soft material and that these operative steps can be performed in one single operation. With respect to the known methods, in which three or four ovens are required, considerable savings are realized by the subject invention with respect to purchases, required space and energy consumption, which are required for the plant for making the products.

Further savings along the aforementioned lines can be obtained with the inventive method in that the required thickness and density, as well as the accuracy of measurement of the applied soft material layers, are obtained without the usual successive series of calibrating rollers in the known devices.

Finally, it should be noted that the inventive method still has the advantage over the known state of the art in accordance with DE-AS No. 21 46 309 in that no kneading process, no strand pressing and no preparation in tablet form is required for the soft material.

Therefore, the inventive method enables one to eliminate the considerable cost and safety preparations as required in the aforementioned method in accordance with DE-AS No. 21 46 309 (see, in particular, column 5, paragraph 3 of the aforementioned patent). In contrast thereto, the inventive method requires only one single operating step.

Other objects and features of the present invention will become apparent from the following detailed description considered in connection with the accompanying drawing, which discloses one embodiment of the invention. It is to be understood that the drawing is to be used for the purposes of illustration only, and not as a definition of the limits of the invention.

In the drawing, wherein similar reference characters denote similar elements throughout the several views:

In the drawing, a schematically-illustrated side view of an installation for making a reinforced support sheet embodying the present invention is illustrated.

Referring now in detail to the drawing, the support material 10 can be a strip of sheet metal, foil, fleece or fabric which is drawn off a supply drum or roller (not shown). As a material for the support material one can use metal, plastic or paper. The shape and the material of the support material depends upon the intended use of the sheet or plate to be made. The feeding direction is shown by an arrow 11. The main stations of the illustrated installation are two pairs of calender rollers 12, 13 and 14, 15, as well as a drying and vulcanization oven 16. A container 17 is associated with the pairs of calender rollers 12, 13 and 14, 15 which serves to receive the flowable bulk material or goods of the soft material and apply the same into the opening between the rollers 12, 13 and 14, 15 of the given pair of calender rollers. The soft material which is contained in containers 17 is a substance in the form of a flowable bulk material.

The soft material should comprise (by weight) at least 80% of a powder-like, asbestos-free mineral base material, for example, a ground rock and only up to 6% binder material. The remaining component, usually about 3% or a maximum of 14% is composed of an asbestos-free fiber material, for example, a polyamide-, cellulose- or other natural- or synthetic fibers. A fine ground shale is preferably used for the base material. However, it is feasable to use other asbestos-free, powder-like mineral materials. The binder material component of the soft material, preferably (in the base condition) a synthetic rubber-toluene-mixture, is limited to about 6%.

The aforementioned materials are admixed in a mixer and thereby result in the desired flowable soft material. The manufacturing method by means of the illustrated installation is performed as follows:

The uncoated support material, for example, a strip of sheet metal, is fed between two rollers 18, 19. Thereat, it can be coated on the surface with an adhesive, if so desired. The adhesive is present in a container 20 above roller 18. If a coating of the support material 10 with adhesive is desirous, the adhesive is "ordered" from container 20 by means of a suitable conventional supply device (not shown) and is applied onto roller 18. From roller 18, it is then applied to the surface of the support material 10. Subsequently, the support material 10 is deflected from an initial horizontal direction into a vertical direction by means of deflection roller 21 and is fed into the opening between the first pair of calender rollers 12, 13. Here, the flowable soft material is applied from container 17 onto the surface of support material 10 which may be applied with adhesive or not. Subsequently, the one-side-coated support material is fed over a further deflection roller 22 and into the already mentioned oven 16 within which a first drying of the applied soft material occurs. When moving through the oven 16, the one-side-coated support material 10 is supported by support rollers 23.

After leaving oven 16 and, after a two-time deflection by about 90°, the one-side-coated support material 10 is fed to a second adhesive coating device, whose components are provided with the same reference numerals as the previously-described adhesive supply device 18–20 for the sake of simplicity and clarity. Here, the still uncoated side of the support material 10 is provided with adhesive, if so desired. Thereafter, the support material 10 is again deflected by means of a deflection roller 25 from the horizontal direction into a vertical direction and a coating is applied on the other side of support material 10 (if need be with the already applied adhesive coating) by the aforementioned second pair of calender rollers 14, 15 and the flowable soft material which is present in the associated container 17.

In this context, it is important to mention that the circumferential speeds of the individual rollers 12, 13 or 14, 15 of each pair of the calender rollers as indicated by arrows 26, 27 or 28, 29 are unequal in their dimension in such a manner that a friction is exerted on the soft material 34, 35.

The support material which is now coated on both sides is then fed into the interior of oven 16 by means of further deflection rollers 30. In this oven, the drying of the previously-applied soft material layer and, simultaneously, the vulcanization of both of the material layers is performed. In order to provide a sufficient time for this process, three rollers 31 are provided with a relatively large diameter which assures that the path travelled by the coated material in the oven is correspondingly long (during its second throughput).

After leaving the oven 16, the finally finished reinforced support sheet is fed over a further deflection roller 32 onto a wind-up roller 33.

The aforedescribed coating method illustrated in the drawing for producing a support material 10 coated on both sides with a soft material layer 34 or 35 enables the application of different material compounds and/or in different thicknesses, depending on the intended load conditions of the flat gaskets which are subsequently made from these sheets. Thereby, the soft material layer 34 can be made of a friction-resistant material composition on the one side of the support material 10. However, these are merely examples for a possible individual design of the soft material layers 34, 35 and the invention is by no means limited to such examples.

Such a design of the reinforced support sheet or plate affords an excellent pressure resistance, good spring back resiliency, temperature resistance and a high longitudinal and transverse stability. Therefore, high requirements can be exerted onto the products which are made by such a sheet or plate, for example, flat gaskets, with respect to mechanical and thermal stress. The inventive sheet or plate, as well as the end products made therefrom are characterized by an extreme low thickness. Because of the solid adherence of the soft material on the support material, no mechanical mountings are required, so that the support material can be smooth-faced.

Accordingly, while only one embodiment of the present invention has been shown and described, it is obvious that many changes and modifications may be made thereunto without departing from the spirit and scope of the invention.

What is claimed is:

1. A method of making a reinforced support sheet for use in forming gaskets and heat resistant plates, the support sheet being of the type including a sheet-like, smooth support material and a layer of vulcanizable soft material covering each of the sides of said sheet-like support material, comprising the steps of:

preparing a composition of an elastomeric soft material comprised by weight of at least 80% of an asbestos-free, mineral base material, up to 14% of an asbestos-free fiber material, and about 6% of an elastomeric binder material;

feeding said sheet-like support material successively between two separate pairs of calender rollers, the two rollers of each pair of which are driven at different circumferential speeds;

applying a layer of said soft elastomeric material as a flowable bulk material successively onto both sides of said support material by means of said calender rollers, said soft elastomeric material being applied onto one side of said support material immediately before it enters the nip between one pair of calender rollers and said soft elastomeric material being applied to the other side of said support material immediately before it enters the nip between the other pair of calender rollers; and drying and vulcanizing said layers of soft elastomeric material in an oven.

2. The method according to claim 1, wherein said drying and vulcanizing steps comprise feeding said support material, following feeding thereof to said one pair of said calender rollers and the application of a layer of said soft elastomeric material to one side thereof, through an oven, via deflection and feeding rollers, to effect drying of said one layer and, following feeding of said support material to the other pair of said calender rollers and the application of the other layer to the other side of said support material, feeding said support material through said oven, via deflection and feeding rollers, in such a manner that a drying of the layer of the soft elastomeric material to the other side of the support material and a vulcanization of both layers occurs.

3. The method of claim 1, additionally including the step of applying an adhesive onto said support material before applying said soft elastomeric material layers.

4. The method of claim 3, wherein said step of applying adhesive comprises feeding said support material along a horizontal travel path between a pair of rollers and applying adhesive supplied from a container disposed above said support material onto the respective side of said support material via said pair of rollers.

5. The method of claim 3, wherein said adhesive is applied by spraying.

6. The method of claim 3, wherein said adhesive is applied electrostatically.

* * * * *